July 1, 1924.

M. A. MARQUETTE 1,499,676

BIAS CUTTING MACHINE

Filed April 30, 1923

INVENTOR
Melvon A. Marquette
BY
ATTORNEY

Patented July 1, 1924.

1,499,676

UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

BIAS-CUTTING MACHINE.

Application filed April 30, 1923. Serial No. 635,467.

*To all whom it may concern:*

Be it known that I, MELVON A. MARQUETTE, a citizen of the United States of America, residing at Chicopee Falls, in the county of Hampden and State of Massachusetts, have invented certain new and useful Improvements in Bias-Cutting Machines, of which the following is a specification.

The present invention relates to apparatus for cutting into bias strips material such, for example, as the rubber-coated fabric used in the manufacture of automobile tire casings. It has for one object the provision of apparatus of this character which operates rapidly enough to act upon the stock as an operation continuous with the calendering, whereby extra handling of the material is avoided. It has various other objects which will appear from the following description and claims.

The invention will now be described in connection with the accompanying drawings, in which—

The bias cutting of rubberized fabric webs has always been a slow operation, while the calendering or rubber-coating is very rapid. The two operations have therefore been carried on separately, with the necessity for winding up the rubberized stock between turns of a separating material after calendering, and unwinding it before the cutting. It is one purpose of this invention to provide a cutting device that can be operated with the calender as a unit if desired, thereby avoiding any intermediate handling of the material.

Figure 1:
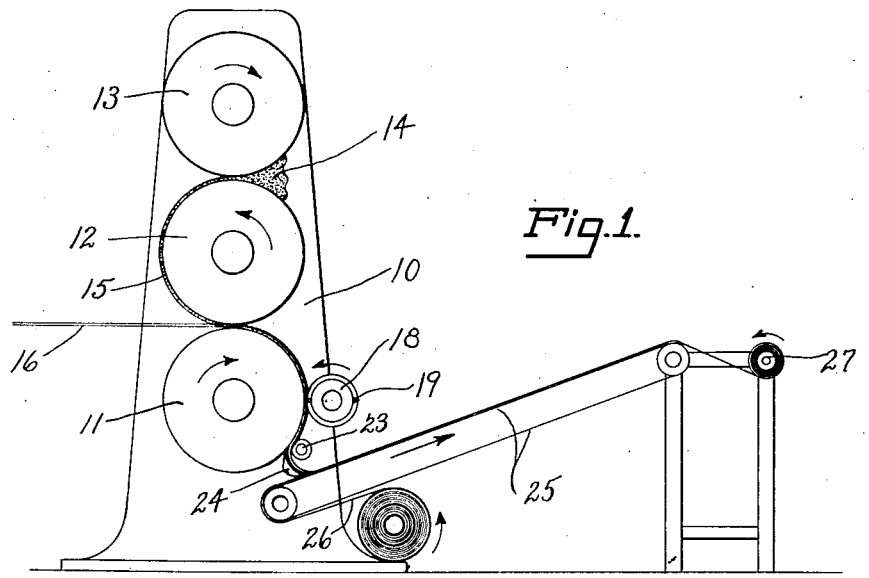
Fig. 1 is a diagrammatic section through a fabric-rubberizing calender, showing the improved cutting device.
Figure 2:
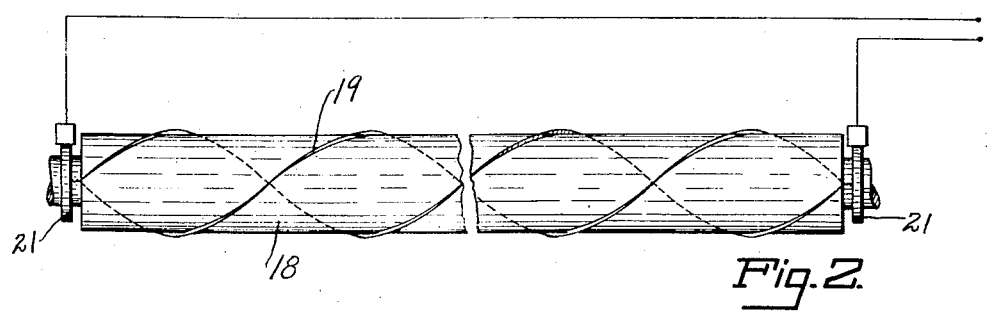
Fig. 2 is a detail of the cutting roll.
Figure 3:
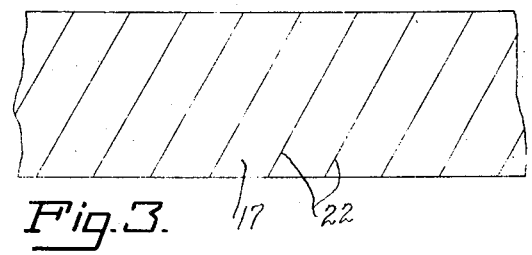
Fig. 3 is a plan detail of a portion of the rubberized fabric web after the cutting operation.

A rubberizing calender such as is shown diagrammatically in Fig. 1 comprises a framework 10 supporting three superposed rolls 11, 12, and 13. Between the upper two of these rollers is placed a feed of rubber 14, which is sheeted out into a continuous web 15 and pressed against the fabric web 16 between rollers 11 and 12. The compound web 17 passes around roll 11 until it meets my improved cutting device. This comprises a cylinder 18 having one or more spiral ribs 19 thereon heated by suitable means such as an electrical current. Current for heating may be supplied from wires 20 through collector rings 21 mounted adjacent the ends of the rollers. By using heated ribs a cutting pressure can be avoided and danger to the surface of the calender roll 11 eliminated. The cylinder 18 is set so that the compound web will be burned on diagonal lines (22, Fig. 3), but that no marring of the calender roll will take place.

The bias strips so cut are led around a roll 23, deflected by a guard 24, and received upon a conveyor belt 25 over which a web 26 of lining or separating material is laid. The two are wound up together by any suitable means on a spool 27. The various parts are geared together or otherwise connected for rotation at the proper surface speeds, as will be readily understood by any mechanic.

Having thus described my invention, I claim:

1. A rubber coating and cutting apparatus comprising a fabric rubberizing calender having a plurality of rolls, and a cylinder coacting with one of said rolls having at least one helical electrically heated rib thereon, whereby the rubberized fabric web is severed into a series of bias strips.

2. A bias cutting apparatus comprising a roll, a cylinder coacting therewith having at least one helical electrically heated rib thereon, whereby the web to be severed will be burned into a plurality of bias strips.

3. A rubber coating and cutting apparatus comprising an electrically heated diagonally ribbed roll contacting with the web, whereby said web is severed into a series of bias strips.

MELVON A. MARQUETTE.